(12) United States Patent
Schmatz

(10) Patent No.: US 7,136,592 B2
(45) Date of Patent: Nov. 14, 2006

(54) SELF ALIGNING OPTICAL DETECTOR

(75) Inventor: Martin Schmatz, Brugg (CH)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 09/682,253

(22) Filed: Aug. 9, 2001

(65) Prior Publication Data

US 2002/0021476 A1  Feb. 21, 2002

(30) Foreign Application Priority Data

Aug. 11, 2000  (EP) ................................. 00810715

(51) Int. Cl.
*H04B 10/00* (2006.01)

(52) U.S. Cl. ...................................... 398/156; 398/131

(58) Field of Classification Search .......... 398/202–214, 398/156, 129, 131; 369/124.12; 250/208.1–208.6, 250/203.1–203.7, 202, 548, 549, 204, 208; 385/89
See application file for complete search history.

(56) References Cited

U.S. PATENT DOCUMENTS

| 4,762,391 | A | * | 8/1988 | Margolin ................... 385/119 |
| 4,786,891 | A | * | 11/1988 | Ueda et al. ................... 341/13 |
| 5,262,635 | A | * | 11/1993 | Curbelo ................... 250/241 R |
| 5,557,693 | A |  | 9/1996 | Stevens et al. |
| 5,747,978 | A | * | 5/1998 | Gariboldi et al. ........... 323/313 |
| 6,788,895 | B1 | * | 9/2004 | Trezza ........................... 398/9 |

* cited by examiner

*Primary Examiner*—Agustin Bello
(74) *Attorney, Agent, or Firm*—F.Chau & Associates LLC

(57) ABSTRACT

An optical detector for receiving an optical signal transmitting via an optical fiber cable, comprises an array of photo-sensors for location in the path of the optical signal. A controller a controller detects which of the photo-sensors receives the optical signal in use, and derives a received signal from an output of any said photo-sensor so detected.

20 Claims, 5 Drawing Sheets

SELF ALIGNING OPTICAL DETECTOR

BACKGROUND OF INVENTION

1. Field of the Invention

The present invention generally relates to optical detectors for optical fibre communications systems and in particular relates to self-aligning optical detectors for such systems.

2. Background of the Invention

A typical optical data communications system comprises a transmitter and a receiver interconnected by an optical fibre. The core diameter of the optical fibre is typically between 8 um and 60 um. At the transmitter, light is modulated by an electrical data signal to be transmitted. The modulated light is injected into one end of the optical fibre. The receiver, at the other end of the fibre, comprises a photosensitive transducer such as a photo-diode or photo transistor for converting incident light from the fibre back into the electrical data signal. It will be appreciated that efficient detection of the received light demands alignment of the end of the fibre and the photosensitive area of the transducer device. Conventionally, alignment is achieved mechanically. However, mechanical alignment requires significant skill and effort in view of the relatively small dimensions of the fibre and transducers. Also, the capacitance of the transducer increases as the photosensitive area is enlarged. As the capacitance of the transducers is increased, the response of the transducer is degraded correspondingly. Therefore, it is desirable to reduce the photosensitive area as far as possible in the interests of maximizing sensitivity.

U.S. Pat. No. 5,557,693 describes an optical communication system having a receiving optical sensor array and a transmitting optical sensor coupled together by a bundle of parallel optical fibres. In use an image is presented to one end of the bundle by the transmitting sensor array and received at the other end of the bundle by the receiving sensor array.

SUMMARY OF INVENTION

In accordance with a feature of the present invention, provided is an optical detector for receiving an optical signal transmitting via an optical fibre cable. The detector includes an array of photo-sensors for location in the path of the optical signal. Further provided is a controller for detecting which of the photo-sensors receives the optical signal, and derives a received signal from any output of the photo-sensor that so detects the optical signal.

The present invention further provides a method for receiving an optical signal transmitting via an optical fibre cable. The method steps include: locating an array of photo-sensors in the path of the optical signal; detecting which of the photo-sensors receives the optical signal; and, deriving a received signal from an output of any the photo-sensor that detects a signal.

BRIEF DESCRIPTION OF DRAWINGS

Preferred embodiments of the present invention will now be described, by way of example only, with reference to the accompanying drawings.

DETAILED DESCRIPTION

Figure 1:
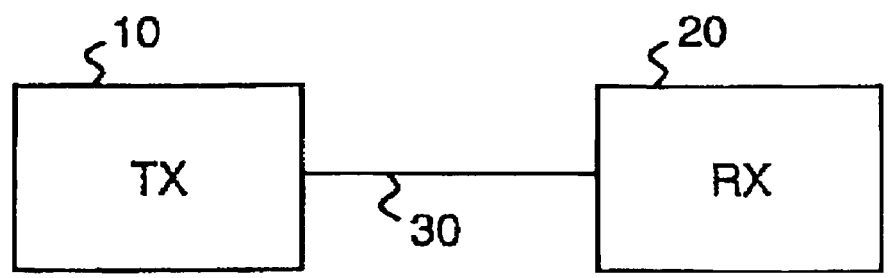
FIG. 1 is a block diagram of an optical communication system embodying the present invention.

The controller effectively selects only the outputs from photo-sensors receiving light from the fibre. The output from the detector is then generated by the controller 60 as a function of the selected outputs. The outputs from the photo-sensors outside the image projected onto the array are discounted. Precision mechanical alignment of the fibre relative to the array is not therefore required. Instead, automatic alignment is effectively provided electronically by the controller detecting actuated photo-sensors.

The controller preferably includes a DC extraction circuitry for extracting a DC component from the output of each photo-sensor in the array, an AC extraction circuitry for extracting an AC component from the output of each photo-sensor in the array, and multiplier circuitry coupled to the DC extraction circuitry and to the AC extraction circuitry for generating a separate output based on the AC component and the DC component of the output of each photo-sensor in the array. Any noise signals produced by a discounted photo-sensor are suppressed by the multiplier circuitry. The multiplier circuitry thus advantageously improves noise rejection by the detector. Each multiplier output may be based on the product of the AC component and the DC component of the output of the corresponding photo-sensor. Alternatively, the multiplier circuitry may comprise a non-linear device such as a switch. The switch may have a hysteresis.

The DC extraction circuitry may include circuitry for extracting the DC component based on the AC signal strength of the output of each photo-sensor in the array.

In preferred embodiments of the present invention, the controller comprises summation circuitry coupled to the multiplier circuitry for combining the multiplier outputs to generate the received signal.

The DC extraction circuitry may comprise a plurality of DC extraction circuits each corresponding to a different one of the photo-sensors. Similarly, the AC extraction circuitry may comprise a plurality of AC extraction circuits each corresponding to a different one of the photo-sensors. Each DC extraction circuit may comprise a DC current sensor coupled to the corresponding photo-sensor. Each AC extraction circuit may comprise a transimpedance amplifier coupled to the corresponding photo-sensor.

In particularly preferred embodiments of the present invention, the multiplier circuitry comprises a plurality of multiplier circuits each corresponding to a different one of the photo-sensors.

In preferred embodiments of the present invention the array of photo-sensors comprises a two dimensional array of photo-sensors. Each photo-sensor in the array may conveniently comprise a photo-diode.

It will be appreciated that the present invention extends to an optical communication system comprising: at least one optical fibre and an optical detector as claimed in any preceding claim facing an end of the optical fibre.

A method of the present invention preferably comprises: extracting a DC component from the output of each photo-sensor in the array; extracting an AC component from the output of each photo-sensor in the array; and, generating the product of the AC component and the DC component of the output of each photo-sensor in the array. Such method may also comprise combining the products of the AC component and the DC component of the outputs of the photo-sensors to generate the received signal.

Referring to FIG. 1, an example of an optical data communication system embodying the present invention comprises a transmitter 10 and a detector 20 interconnected by an optical fibre 30. In operation, at the transmitter 10, light is modulated by an electrical data signal 40 to be transmitted. The modulated light is injected into one end of the fibre 30. The detector 20, at the other end of the fibre 20, converts incident light from the fibre 30 back into the electrical data signal.

Figure 2:
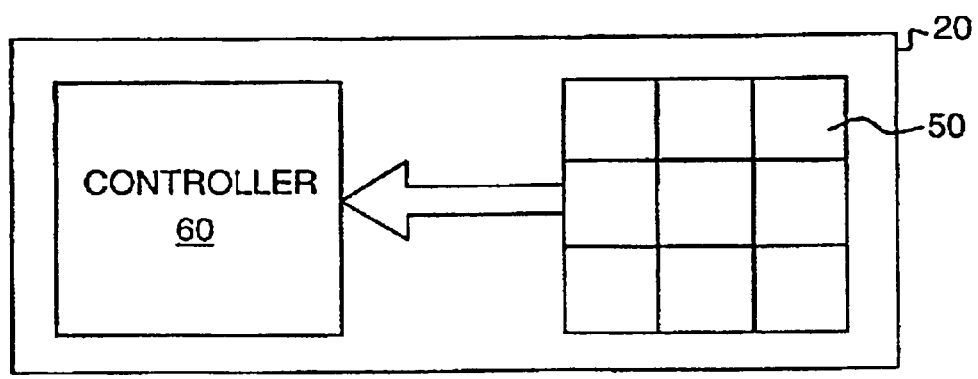
FIG. 2 is a block diagram of an optical detector of the optical communication system.

Referring now to FIG. 2, the detector 20 comprises a plurality of photo-sensors 50. In the embodiment shown in FIG. 2, the photo-sensors 50 are arranged in a two dimensional array. However, it will be appreciated that, in other embodiments of the present invention, the photo-sensors 50 may be arranged in a one-dimensional array. It will be recognized that other arrangements of photo-sensors 50 are also possible. The detector 20 also comprises a controller 60 coupled to the photo-sensors 50. In operation, the controller 60 detects which of the photo-sensors 50 receives the optical signal, and derives a received signal from an output of any photo-sensor 50 so detected.

Figure 3:
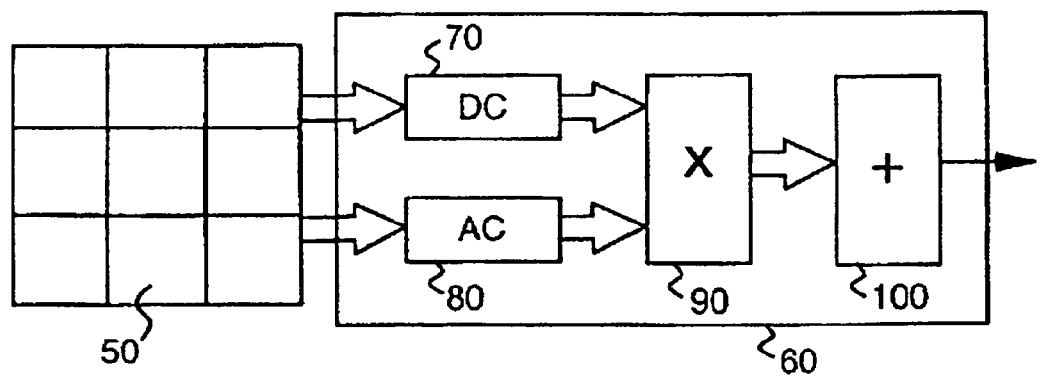
FIG. 3 is a block diagram of a controller of the optical detector.
Figure 4:
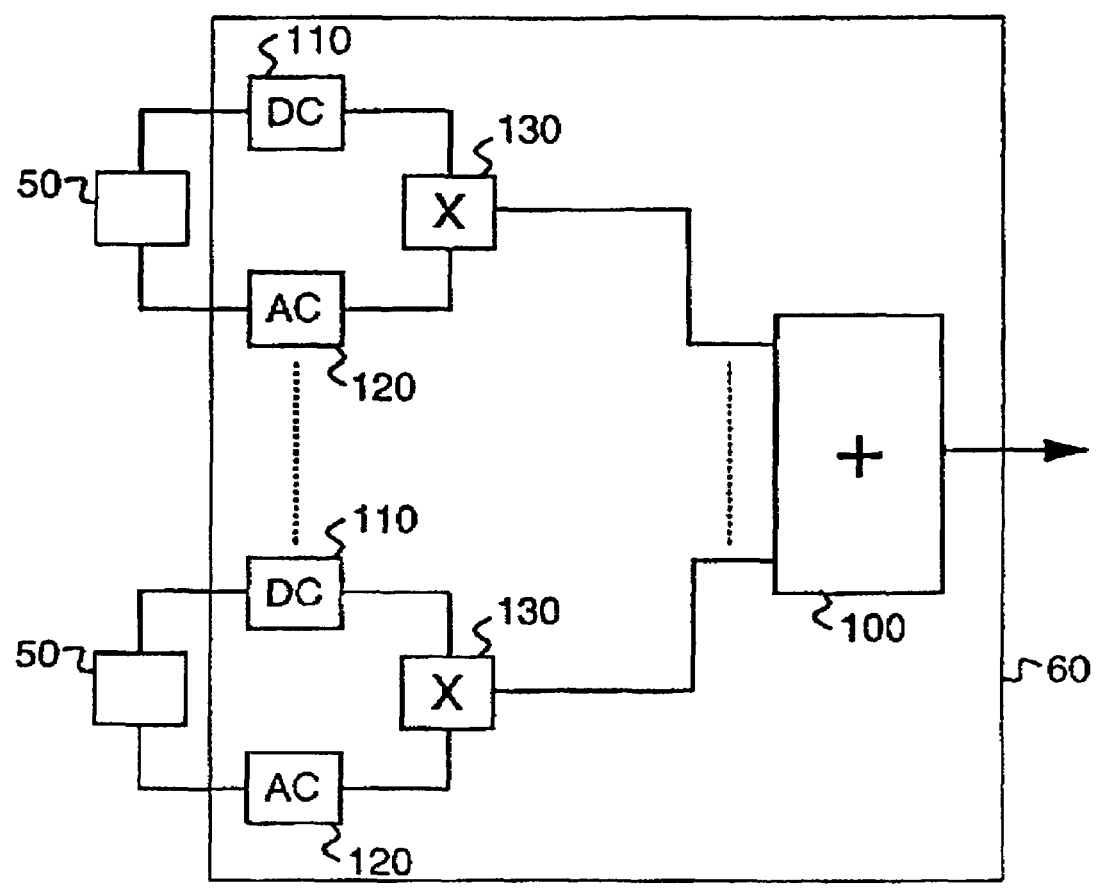
FIG. 4 is another block diagram of a controller of the optical detector.

With reference to FIG. 3, the controller 60 comprises DC extraction circuitry 70. Each photo-sensor 50 in the array is coupled to the DC extraction circuitry 70. In operation, the DC extraction circuitry 70 extracts a DC component from the output of each photo-sensor 50. The controller 60 also comprises AC extraction circuitry 80. Again, each photo-sensor 50 in the array is connected to the AC extraction circuitry 80. In operation, the AC extraction circuitry 80 extracts an AC component from the output of each photo-sensor 50 in the array. The controller 60 further comprises multiplier circuitry 90 coupled to the DC extraction circuitry 70 and to the AC extraction circuitry 80. In operation, the multiplier circuitry 90 generates the product of the AC component and the DC component of the output of each photo-sensor 50 in the array. The controller also comprises summation circuitry 100 coupled to the multiplier circuitry 90 for combining the products of the AC component and the DC component of the outputs of the photo-sensors 50 to generate the received signal at the output of the detector 20.

Figure 5A:
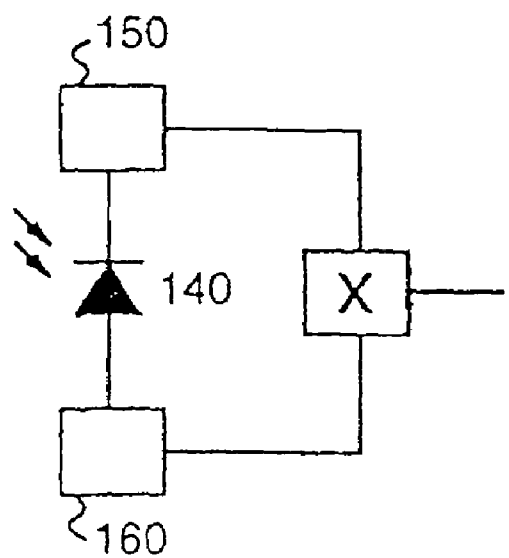
FIG. 5a is a block diagram of an exemplary embodiment of an AC and DC extraction circuit portions of the controller.

Referring now to an exemplary embodiment of the current invention as depicted in FIG. 5a, each photo-sensor 50 in the array comprises a photo-diode 140. Each DC extraction circuit 110 comprises a DC current sensor 150 having an input connected to the cathode of the corresponding photo-diode 140 and each AC extraction circuit 120 comprises a transimpedance amplifier 160 coupled to the anode of the corresponding photo-diode 140.

Figure 5B:
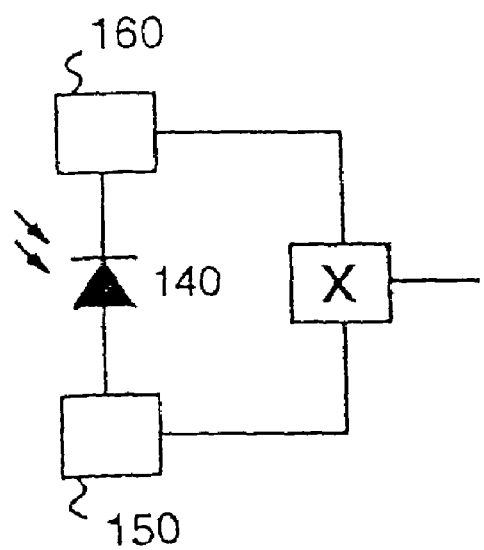
FIG. 5b is a block diagram of another exemplary embodiment of an AC and DC extraction circuit portions of the controller.

Referring now to an exemplary embodiment of the current invention as depicted in FIG. 5b, each photo-sensor 50 in the array comprises a photo-diode 140. Each DC extraction circuit 110 comprises a DC current sensor 150 having an input connected to the anode of the corresponding photo-diode 140 and each AC extraction circuit 120 comprises a transimpedance amplifier 160 coupled to the cathode of the corresponding photo-diode 140.

During installation of the optical communication system herein before described with reference to FIG. 1, an end of the optical fibre 30 is connected, via a mechanical connector, to the detector 20. The array of photo-sensors 50 is positioned in the detector 20 such that the photo-sensors 50 face the end of the optical fibre 30. Alignment of the end of the optical fibre 30 with particular ones of the facing photo-sensors 50 is not critical. It is sufficient that at least one of the photo-sensors 50 faces the fibre.

In use, a data signal is transmitted from the transmitter 10 along the optical fibre 30 in the form of modulated light energy. At the detector 20, the received light impinges upon those photo-sensors 50 facing the end of the optical fibre. Each DC extraction circuit 110 produces an output signal indicative of a DC current flowing in the corresponding photo-sensor 50. The DC current is indicative of light falling on the photo-sensor 50. Accordingly, if no light falls on a given photo-sensor 50, no output signal is produced by the corresponding DC extraction circuit. Simultaneously, each AC extraction circuit 120 produces an output signal indicative of the AC signal sensed by the corresponding photo-sensor 50. The AC signal is indicative of the data signal modulated onto to the light carried by the optical fibre 30 to the corresponding photo-sensor 50. The output of the AC extraction circuit 120 is multiplied, via the multiplier circuit 130, by the output from the DC extraction circuit 110. Thus, if there is no output from the DC extraction-circuit 110, there is no output from the multiplier circuit 130.

If the end of the fibre 30 spans two or more photo-sensors 50, then each of the corresponding multiplier circuits 130 produces an output when light is carried along the fibre 30. The outputs from the multiplier circuits 130 are combined by the summation circuitry 100 to produce the output signal from the detector 20.

It will be appreciated therefore that the controller 60 effectively selects only the outputs from photo-sensors 50 receiving light from the fibre 30. The output from the detector 20 is then generated by the controller 60 as a function of the selected outputs. The outputs from the photo-sensors 50 outside the image projected onto the array are discounted. Any noise signals produced by the discounted photo-sensors 50 are suppressed by the corresponding multiplier circuits 130. The multiplier circuits 130 thus advantageously improve noise rejection by the detector 20. It should now be recognized that precision mechanical alignment of the fibre 30 relative to the array is avoided. Instead, automatic alignment is effectively provided electronically by the controller 60 detecting actuated photo-sensors 50.

In an embodiment of the present invention herein before described, each photo-sensor 50 in the array was associated with a different DC extraction circuit 110, AC extraction circuit 120, and multiplier circuit 130. However, in other embodiments of the present invention one or more of the inputs and outputs of the DC extraction circuitry 70, AC extraction circuitry 80, and multiplier circuitry 90 may be multiplexed. In alternative embodiments of the present invention, the DC extraction circuitry 70 may be replaced by circuitry for determining AC signal strength. It will be appreciated that the multiplier circuitry 90 may be linear or non-linear in operation. Therefore, in some embodiments of the present invention, the multiplier circuitry 90 may perform a non-linear function instead of a linear function. Such a non-linear function may for example be performed by a switch. It will also be such a non-linear function may include a degree of hysteresis.

The detector 30 may be conveniently embodied in an application specific integrated circuit (ASIC). In the interests of high speed optoelectronic operation, the ASIC embodying the detector 30 is fabricated in Gallium Arsenide. However, in other embodiments of the present invention, other high speed optoelectronic semiconductor technologies may employed. It will be appreciated that, in some embodiments of the present invention, examples of the detector 20 and the transmitter 10 herein before described may be integrated in a unitary transceiver module for both receiving data from, and transmitting data to a remote network node via the optical fibre 30.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

The invention claimed is:

1. An optical detector that electronically aligns to an optical fiber, the optical detector comprising: a photo-detector device comprising an array of photo-sensors, which receives an optical signal output from an end of an optical fiber; and a controller operatively connected to the photo-detector device, to generate a detection signal by processing photo-sensor signals output from one or more photo-sensors in the array that are actuated by said optical signal, while discounting photo-sensors in the array that are not actuated by said optical signal, to thereby electronically align the optical fiber to the photo-detector device, wherein the controller comprises: DC extraction circuitry for extracting a DC components from the photo-sensor signal output from each photo-sensor in the array; AC extraction circuitry for extracting an AC component from the photo-sensor signal output from of each photo-sensor in the array; and multiplier circuitry coupled to the DC extraction circuitry and to the AC extraction circuitry for generating a separate multiplier output based on the AC component and the DC component of the photo-sensor signal output from each photo-sensor in the array.

2. An optical detector as claimed in claim 1, wherein each multiplier output is based on the product of the AC component and the DC component of the photo-sensor signal output from the corresponding photo-sensor.

3. An optical detector as claimed in claim 1, wherein the controller comprises summation circuitry coupled to the multiplier circuitry for combining the multiplier outputs to generate the received optical signal as the detection signal.

4. An optical detector as claimed in claim 3, wherein the DC extraction circuitry comprises a plurality of DC extraction circuits each corresponding to a different one of the photo-sensors and wherein the AC extraction circuitry comprises a plurality of AC extraction circuits each corresponding to a different one of the photo-sensors.

5. An optical detector as claimed in claim 4, wherein each DC extraction circuit comprises a DC current sensor coupled to the corresponding photo-sensor.

6. An optical detector as claimed in claim 4, wherein each AC extraction circuit comprises a transimpedance amplifier coupled to the corresponding photo-sensor.

7. An optical detector as claimed claim 1, wherein the multiplier circuitry comprises a plurality of multiplier circuits each corresponding to a different one of the photo-sensors.

8. An optical detector as claimed in claim 1, wherein the DC extraction circuitry comprises circuitry for extracting the DC component based on the AC signal strength of the photo-sensor signal output from each photo-sensor in the array.

9. An optical detector as claimed in claim 1, wherein the multiplier circuitry comprises a switch.

10. An optical detector as claimed in claim 9, wherein the switch has a hysteresis.

11. An optical detector as claimed in claim 1, wherein each photo-sensor in the array comprises a photo-diode, the photo-diode having an anode and a cathode.

12. An optical detector as claimed in claim 1, wherein the array of photo-sensors comprises a two dimensional array of photo-sensors.

13. An optical communication system, comprising:
an optical fiber for transmitting an optical signal;
an optical detector disposed to face an end of the optical fiber, wherein the optical detector electronically aligns to the optical fiber, the optical detector comprising:
a photo-detector device comprising an array of photo-sensors, which receives an optical signal output from the end of the optical fiber; and
a controller operatively connected to the photo-detector device, to generate a detection signal by processing photo-sensor signals output from one or more photo-sensors in the array that are actuated by said optical signal, while discounting photo-sensors in the array that are not actuated by said optical signal, to thereby electronically align the optical fiber to the photo-detector device,
wherein the controller comprises DC extraction circuitry for extracting a DC component from the output of each photo-sensor in the array, AC extraction circuitry for extracting an AC component from the output of each photo-sensor in the array, and multiplier circuitry coupled to both the DC and AC extraction circuitry for generating a separate multiplier output based on the AC component and the DC component of the output of each photo-sensor in the array.

14. An optical detector as claimed in claim 11, wherein the AC extraction circuitry is connected to the anode of the photo-diode.

15. An optical detector as claimed in claim 11, wherein the AC extraction circuitry is connected to the cathode of the photo-diode.

16. An optical detector as claimed in claim 11, wherein the DC extraction circuitry is connected to the anode of the photo-diode.

17. An optical detector as claimed in claim 11, wherein the DC extraction circuitry is connected to the cathode of the photo-diode.

18. A method for processing an optical signal, comprising the steps of: locating a photo-detector device having an array of photo-sensors in the path of an optical signal output from an end of an optical fiber; and electronically aligning the photo-detector device to the end of the optical fiber, wherein electronically aligning comprises: processing photo-sensor signals output from one or more photo-sensors in the array that are actuated by the optical signal; generating a detection signal by processing said photo-sensor signals output; and discounting photo-sensors in the array that are not actuated by said optical signal, wherein generating comprises: extracting a DC component from the output of each photo-sensor in the array, extracting an AC component from the output of each photo-sensor in the array, and generating a separate multiplier output via multiplier circuitry based on the AC component and the DC component of the output of each photo-sensor in the array.

19. A method as claimed in claim 18, further comprising basing each multiplier output on the product of the AC component and the DC component of the output of the corresponding photo-sensor.

20. A method as claimed in claim 18, further comprising combining the multiplier outputs to generate the detection signal.

* * * * *